(No Model.)
J. BOLGIANO.
FAUCET ATTACHMENT.
No. 519,521. Patented May 8, 1894.
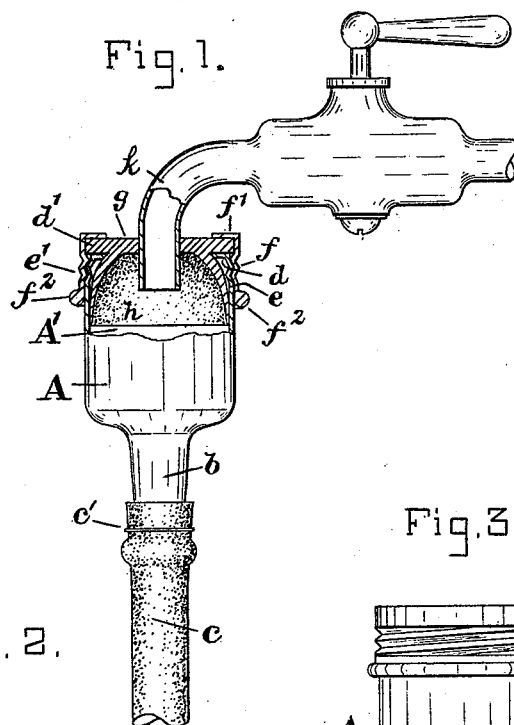
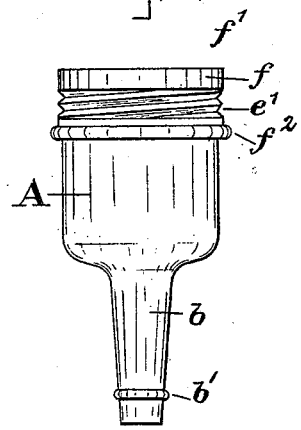
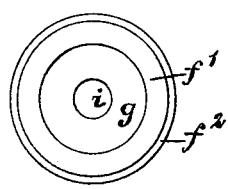
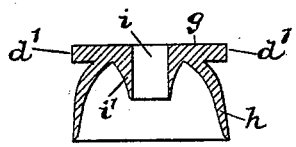
WITNESSES.
L. Ismy Van Horn.
Chas. B. Mann Jr.
INVENTOR,
John Bolgiano
By Chas B. Mann
ATTORNEY.

UNITED STATES PATENT OFFICE.

JOHN BOLGIANO, OF BALTIMORE, MARYLAND.

FAUCET ATTACHMENT.

SPECIFICATION forming part of Letters Patent No. 519,521, dated May 8, 1894.

Application filed August 4, 1893. Serial No. 482,325. (No model.)

*To all whom it may concern:*

Be it known that I, JOHN BOLGIANO, a citizen of the United States, residing at Baltimore, in the State of Maryland, have invented certain new and useful Improvements in Faucet Attachments, of which the following is a specification.

This invention relates to an improved device for attaching a hose to a faucet. One use to which I design to put the device is to attach to a water faucet the supply hose leading to a portable water motor.

The accompanying drawings illustrate the invention.

Figure 1. is a view of a water faucet and a sectional view of the improved hose attaching device. Fig. 2. is a top view of the device. Fig. 3. is a side view. Fig. 4. shows a modification of the rubber packing.

The device comprises the cylindric shell, A, forming a chamber, A', having a funnel-shaped lower part, $b$, to which the hose, $c$, is attached. The neck of the funnel, $b$, has a swell or bulge, $b'$, over which the hose, $c$, is slipped and then fastened by a wire or cord $c'$ around the hose and above the swell, in any suitable manner. The cylindric shell is made of thin sheet metal spun up or otherwise shaped. The upper rim of the body has an inturned flange, $d$, and an external screw-thread, $e$; a screw-ring to confine the rubber packing comprises a collar, $f$, having an inturned flange, $f'$, and screw-threads, $e'$, and provided with a bead or wire edge, $f^2$.

The rubber packing and its arrangement to co-act with the shell-rim and screw-ring is an important feature of my invention.

The rubber packing, see Fig. 1, has a circular top, $g$, with a rim-flange, $d'$, which is seated on top of the inturned rim, $d$, of the body, and a skirt or bell-shaped flange, $h$, is pendent down from the circular top. The flat circular top of the rubber packing is greater in diameter than the bell-shaped flange at the point where the latter is attached to it. Thus the rim-flange, $d'$, is in the same plane with the flat top and projects beyond the bell-shaped flange and is clamped and held securely between the two flanges, $d$, and $f'$. To insure a water-tight joint and prevent leakage between the exterior screw-threads, $e$, and the collar, $f$, the pendent end of the bell-shaped flange fits against the inner wall of the body below the point where the exterior screw-threads, $e$, are located; as the wall of the shell is made of thin metal and the said exterior screw-threads, $e$, are made by pressing the thin walls of the metal inward (and not by cutting the metal as is commonly done in producing screw-threads) it results that the screw-thread formation is also on the interior of the wall. The effect of this in practice is that the water-pressure within the shell or chamber, A', bears on the inside of the bell-shaped flange and expands it and thereby presses it close and tight against the inner wall and prevents the water from access to the screw-threads.

The rubber packing has a central opening, $i$, to receive the nozzle, $k$, of the faucet and these parts are attached in their operative position in Fig. 1.

The rubber packing shown in Fig. 4 has the same rim-flange, $d'$, and bell-shaped flange, $h$, as in Fig. 1, but also has around the central opening, $i$, and at the lower side of the circular top a tapered boss, $i'$, which depends downward into the top of the bell-shaped part. The nozzle of the faucet is to enter the opening, $i$, and fit tight within the depending tapered boss, $i'$. With this construction when the water within the shell exerts an upward pressure on the lower side of the circular top, $g$, the depending tapered boss, $i'$, tends to close tighter around the nozzle and thereby prevent leakage at the opening, $i$.

Having thus described my invention, I claim as new and desire to secure by Letters Patent of the United States—

A faucet attachment having, in combination, a shell, A, provided with a funnel-shaped nozzle, $b$, at one end, an inturned flange, $d$, at the other end, and an external screw-thread, $e$, around the latter end; a rubber packing having a flat circular top with a central hole and a rim-flange $d'$ projecting in the plane of the flat top, a bell-shaped flange, $h$, pendent from said top and fitting against the inner wall of the shell below the point where the screw-threads, $e$, are located—said rim-flange resting on the inturned flange of the shell; and a screw-ring having an inturned flange, $f'$, to clamp the said rim flange, $d'$, as shown and described.

In testimony whereof I affix my signature in the presence of two witnesses.

JOHN BOLGIANO.

Witnesses:
CHAS. B. MANN, Jr.,
L. ISMY VAN HORN.